United States Patent
Andre (10) Patent No.: US 9,132,847 B2
(45) Date of Patent: Sep. 15, 2015

(54) SYSTEM FOR DYNAMIC CONTROL OF THE ROLLING OF THE GUIDE ROLLER(S) FOR AN ASSEMBLY FOR GUIDING A VEHICLE ALONG AT LEAST ONE RAIL

(71) Applicant: NewTL, Ernolsheim (FR)

(72) Inventor: Jean-Luc Andre, Molsheim (FR)

(73) Assignee: NewTL (FR)

( * ) Notice: Subject to any disclaimer, the term of this patent is extended or adjusted under 35 U.S.C. 154(b) by 0 days.

(21) Appl. No.: 14/354,880

(22) PCT Filed: Oct. 24, 2012

(86) PCT No.: PCT/IB2012/055855
§ 371 (c)(1),
(2) Date: Apr. 28, 2014

(87) PCT Pub. No.: WO2013/061263
PCT Pub. Date: May 2, 2013

(65) Prior Publication Data
US 2014/0306068 A1    Oct. 16, 2014

(30) Foreign Application Priority Data

Oct. 28, 2011    (FR) ...................................... 11 59794

(51) Int. Cl.
*B61B 13/04*    (2006.01)
*B61K 9/00*    (2006.01)
*B61L 15/00*    (2006.01)
(Continued)

(52) U.S. Cl.
CPC ............... *B61L 15/0081* (2013.01); *B61F 9/00* (2013.01); *B61F 9/005* (2013.01); *B61K 9/00* (2013.01); *B62D 1/265* (2013.01); *B61B 13/04* (2013.01)

(58) Field of Classification Search
CPC ...... B61K 9/00; B62D 1/265; B61L 15/0081; B61F 9/00; B61F 9/005; B61B 13/04
See application file for complete search history.

(56) References Cited

U.S. PATENT DOCUMENTS

| 4,089,272 A | 5/1978 | Schmitz |
| 2003/0178532 A1* | 9/2003 | Moretti et al. ............ 246/169 R |

(Continued)

FOREIGN PATENT DOCUMENTS

| DE | 322611 C | 7/1920 |
| DE | 202005011269 U1 | 9/2005 |

(Continued)

OTHER PUBLICATIONS

International Search Report Application No. PCT/IB2012/055855 Completed: Dec. 20, 2012; Mailing Date: Jan. 7, 2013 2 pages.

*Primary Examiner* — Michael J Zanelli
(74) *Attorney, Agent, or Firm* — St. Onge Steward Johnston & Reens LLC (57) ABSTRACT

A system of dynamic control of rolling on at least one guide rail for a guidance system of a vehicle along at least one guide rail, composed of at least one roller or at least one pair of guide rollers rolling along this guide rail, is characterized in that it incorporates a vibrational sensor located near at least one roller or at least one pair of guide rollers and a proximity sensor, and in that the signals transmitted by these sensors, or the circuits in which they are placed, are continually analyzed to establish a commencement of guidance failure, a guidance failure, a limit of wearing of or damage to the roller(s) or their tires. This invention is of interest to manufacturers of vehicles guided along at least one rail.

14 Claims, 5 Drawing Sheets

(51) Int. Cl.
  *B62D 1/26* (2006.01)
  *B61F 9/00* (2006.01)

(56) References Cited

U.S. PATENT DOCUMENTS

2010/0065692 A1* 3/2010 Andre .......................... 246/121
2012/0006946 A1* 1/2012 Clarissou ..................... 246/120
2012/0126066 A1* 5/2012 Consoli ........................ 246/170

FOREIGN PATENT DOCUMENTS

EP 2253523 A1 * 11/2010
GB 2461148 A 12/2009

* cited by examiner

SYSTEM FOR DYNAMIC CONTROL OF THE ROLLING OF THE GUIDE ROLLER(S) FOR AN ASSEMBLY FOR GUIDING A VEHICLE ALONG AT LEAST ONE RAIL

FIELD OF THE INVENTION

The invention pertains to a system for dynamic monitoring of the rolling of one or more rolling components for a system of guidance by rolling along at least one rail, particularly on the ground for a road vehicle, particularly a public transport vehicle.

BACKGROUND OF THE INVENTION

More particularly, this dynamic monitoring system combines the generation and recognition of a vibrational state and the indication of a difference in elevation of the rolling component(s) of the guidance system in relation to the guide rail(s), in view of supplying an information item concerning the derailment risk and status and the wearing of these rolling components, or of their tires.

Such a detection can result from a measurement or a recognition of a vibrational state, and an inductive measurement from sensors located on the guidance system, to report any guidance failure, in order to prevent accidents subsequent to a derailment and, in any case, to minimize the consequences of a derailment. The aim is to warn of a potential derailment, namely the commencement of a guidance failure, in view of undertaking security and safety actions.

The guidance of a vehicle by means of a guidance system along at least one rail—on the ground, for example—is only ensured if the means of rolling on and along this guide rail remains in constant contact with it.

The invention herein particularly—but not exclusively—concerns the particular case of guidance by two inclined rollers rolling on the inclined paths of a guide rail, such as illustrated in the Figures. These rails can each have a flange.

The guidance is normal and safe when the rollers hug the rail. Generally, the part of the roller in contact with the rail is made of a relatively flexible material—rubber or polyurethane, for instance. But, in any case, this part of the roller does not have the same stiffness characteristics as the flange, whether or not it is made of the same material or is made of another material.

Flanged rollers are one of the preferred forms of implementation of the invention, because it addresses all types of guide rollers or guide wheels. One can very well imagine applying this invention to guidance devices that incorporate a fixed casing in rotation, connected to the mounting of the roller(s), and protruding in relation to the rolling path of the rollers.

If the guide roller(s) come into rolling contact with its/their rolling path(s) via its/their flange(s) or its/their casing(s), the vehicle equipped with the guidance system continues to follow its trajectory; however, derailment should be anticipated. In this case, the guidance part that has entered into contact with the rail is made of steel. One thus has a metal-on-metal contact. Then, if the rollers leave the rail, since the flanges or the casing are protruding—i.e. protruding in relation to them—the latter will come into contact with the road surface. In this case, too, the vibrational signature is different.

Accordingly, one will easily understand that there is a difference in the vibrational signature measured on the guide rollers' mounting in the case of rolling/guidance and all other cases.

Yet there are multiple causes for deviation of these means of rolling followed by departure from the guide rail. This risk of derailment can be very high—particularly in urban areas in which the various routes and movements cause exposure to various forms of pollution and emissions, in addition to the debris and material carried by bad weather/unpredictable events and exception weather events.

Several technical solutions to counteract derailment have been identified, allowing one to ensure safety of guidance up to a certain point. But none of the passive anti-derailment systems give complete satisfaction with regard to the demanding safety requirements of urban transport for people.

When the guidance system derails—for example, in the case of a local discontinuation of the guide rail, the presence of an obstacle or unexpected object on the guide rail, ice, or whatever other cause—accidental lifting from the guidance system can occur. Because the vehicle is no longer guided, the only solution that the driver has is to stop until it is again positioned correctly above the guide rail, by virtue of external action.

There is a need for an early detection and real-time detection system for risk of derailment and derailment.

The invention herein constitutes an appropriate solution that caters to this need and, furthermore, that detects the wear limit of or damage to the tires of the guide rollers.

SUMMARY OF THE INVENTION

The system for dynamic monitoring of rolling on the guide rail and contact with this rail according to the invention ensures a constant, real-time surveillance of the rolling of the guide rollers or guide wheels on the guide rail, in view of outputting an alarm when there is the slightest deviation or change in elevation or trajectory of the roller(s) and, more generally, of the guidance system of which it/they form part.

If this system for dynamic monitoring of rolling and contact with the guide rail detects that the guidance system is separating from the rail with which it is supposed to remain in contact—namely, that the vibrational signature has changed—and that its vertical distance in relation to the rail has augmented, a warning signal alerts the surveillance and safety system and the driver of the vehicle, who can take appropriate action, according to the safety rules/instructions relevant to the severity of the incident. This same warning signal can also actuate safety systems that cause, for example, stoppage of the vehicle or engagement of an active anti-derailment or re-enrailment system.

The system according to the invention is also able to detect wearing of or damage to the tires of the rollers constituting the means of rolling of the guidance system on the rail. This, therefore, provides safety-related surveillance and maintenance-related surveillance for the replacement of these tires.

Thus, the invention has a dual purpose. Firstly, it provides constant surveillance of the satisfactory operation of the guidance, and provides earliest warning of a guidance failure. Secondly, it enables preventive maintenance, by detecting normal or excessive wearing of the tires of the rollers.

Accordingly, the invention concerns a system for dynamic monitoring of contact between the rail and the means of rolling of a road vehicle guidance system, by movement along at least one guide rail, particularly on the ground.

Such a system can operate in all normal situations of movement or stoppage of the vehicle, i.e. in both directions of travel, over the entire range of authorized speeds, when passing switch points, crossings or expansion joints, when rolling in sharp bends, during braking, etc. Moreover, since the nondetection of a guidance failure is a particularly feared event, the failure rate of the system must be as low as possible.

According to the invention, this system for dynamic monitoring of guidance and contact with the rail includes at least one sensor with a capability for generating a vibrational signal, associated with a means of recognition of a vibrational regime corresponding to a critical state of guidance or wearing of the roller(s) or of its/their tire(s), and a proximity sensor reporting on the elevation of the roller(s) or of the guidance system in relation to the rail. The combined analysis of the signals from these two sensors enables one to draw a conclusion concerning a derailment or guidance failure. An alert from the vibrational sensor alone indicates either a sensor failure or a defective tire or defective tires. An alert from the proximity sensor alone indicates a failure of this sensor. The occurrence of both the above alerts at the same time indicates a derailment.

The detection system generating a vibrational signal will preferably include at least one accelerometer integral with the mechanical gear carrying each pair of guide rollers. The signal output from the accelerometer or from each accelerometer is processed and subjected to frequency-related analysis, for example, to establish an information item concerning the state of operation of the guidance system.

The proximity sensor is, preferably, of inductive type. It includes an inductive sensor that monitors the dimension between a fixed reference on the guidance system—for example, the guide rollers lower axle and the upper surface of the guide rail. This dimension is practically unvarying when there is no guidance failure. It can reduce slightly over time, as normal wear of the roller tires occurs. This thus touches upon the mechanical engineering of the guidance system, the vehicle and the infrastructure.

The outputs from the acceleration sensors and the inductive proximity sensor are easily accessible, and are carried to connectors, for the purpose of quick and easy maintenance.

These sensors are particularly robust with regard to temperature variations, wear, shocks and vibrations, which ensures long-term reliability of the dynamic monitoring system covered by the invention.

In addition, the combination of the two redundant technologies, which do not have a common failure mode, enables one to considerably diminish the risks of a global failure of the dynamic monitoring system covered by the invention.

This system for dynamic monitoring of contact with the rail includes many other advantages, among which the following can be cited:

it works with tires that are not the same on the right and left rollers on a given guidance assembly, or on the front and rear guidance assemblies;

it works no matter what the direction of travel or the speed;

it does not require adjustment or calibration on the trainset; thus, it is immediately operational after the vehicle starts up;

it is insensitive to normal conditions of wear: passing through switch points, crossings, expansion systems or enrailment monitoring systems, rolling against the flange of the guide rollers in tight bends, emergency braking, etc.; and it also works just as well on an end axle or an intermediate axle of the vehicle.

Lastly, the system for dynamic monitoring of rolling and contact with the rail can provide other information items than those concerning derailment. For example, it can provide signals of which the form and frequency indicate the wearing of the guidance components, or of their tires, or indicate their failure.

BRIEF DESCRIPTION OF THE DRAWINGS

Other characteristics and advantages of the invention will come to the fore upon reading the detailed description that follows, which makes reference to the appended drawings, of which.

DETAILED DESCRIPTION OF THE INVENTION

For reasons of simplification, the term "guide roller" will be used below. Obviously, by "roller(s)" one should understand very generally any rolling component that travels on a rail, including railway train wheels or tramway wheels.

The invention herein proceeds from the general inventive idea by which one uses a dynamic monitoring system (1) on a guidance system (2) of a vehicle of whatever nature traveling along at least one guide rail (3), particularly on the ground (4), in which there is at least one vibrational sensor (5), for example, an accelerometer (6), and at least one proximity sensor (7), for example, an inductive sensor (8), carried or secured to this guidance system (2), close to at least one roller (9), or at least one pair of guide rollers (9), and one utilizes the signals from these sensors, (5), (7), to establish whether there is a guidance failure, the derailment status, and simple wearing of the tires of the guide rollers (9).

More particularly, one uses the signals transmitted from each vibrational sensor (5), subjecting them to frequency-related analysis, and one compares the level of the signal from the proximity sensor (7) with a reference distance, to establish whether the signals from the vibrational sensor(s) (5) indicate damage to or wearing of the guide rollers (9), or indicate a derailment if there is a concomitance with the two alarms provided by the detection systems.

A more-detailed description of these systems and their implementation will be provided below, with reference to the various Figures.

As an illustration, the dynamic monitoring system (1) according to the invention is described here mounted on a guidance system (2) designed for a ground vehicle guided along a central rail (3), particularly on the ground (4). Of course, this system (1) is not specific to this type of guidance system, and it can be adapted and used with any guidance system based on contact with at least one guide rail.

Figure 1:
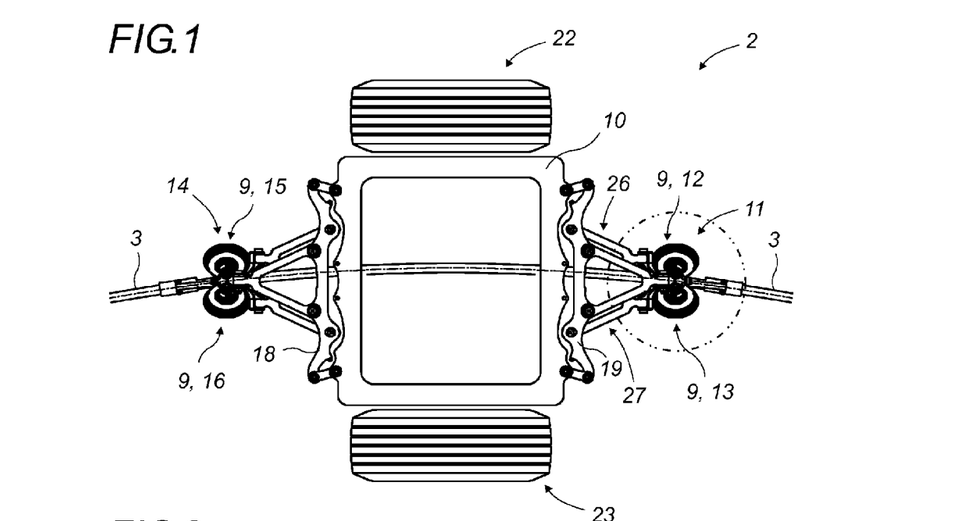
FIG. 1 is a top view of an axle of the vehicle guided by a guidance system with two pairs of rollers, each incorporating a dynamic contact monitoring system.
Figure 2:
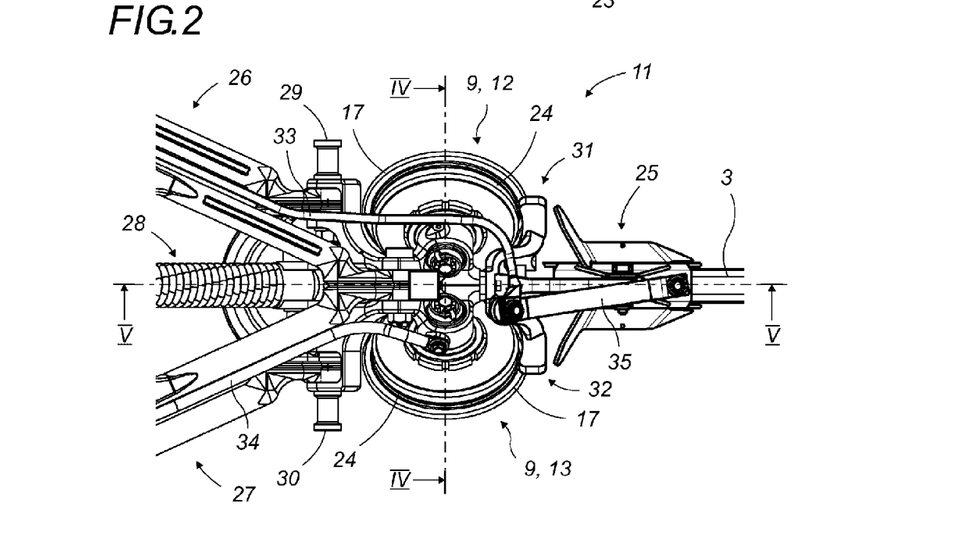
FIG. 2 is a detailed view of the encircled part of FIG. 1.
Figure 3:
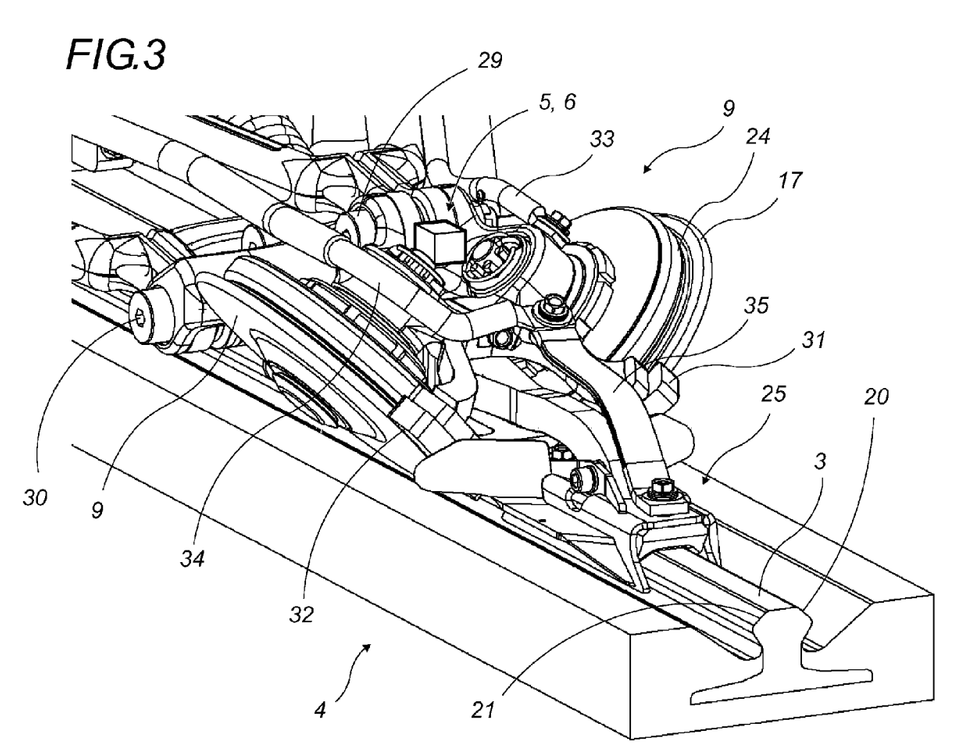
FIG. 3 is a view in perspective of FIG. 2.

In the guidance system described as a preferred implementation, each axle or axle frame (10) of the guided vehicle uses a guidance system (2) including two pairs of guide rollers (9), namely one pair (11) of leader wheels, (12) and (13), located towards the front, with reference to the direction of travel, and one pair (14) of follower wheels, (15) and (16), located to the rear, with reference to the direction of travel, which enables the vehicle to travel in both directions. Obviously, one understands that, if the vehicle is uni-directional, there is only one guidance system located towards the front, with reference to the direction of travel.

The guide rollers (9) are preferably of flanged type, such as (17), and with a flexible tire (24), or at least one other characteristic of mechanical stiffness such as the flanges, namely a lower stiffness.

One can also use rollers without tires. The peripheral surface of rolling or of the rollers is then special, and particularly of composite nature with a different radial stiffness, in particular lower than that of the flanges or protruding part of the rollers, or close to them and, for example that of the rail.

The same effect can be obtained by an entirely-metallic roller of which the rolling periphery is made of a material of lesser stiffness than the flanges or the protruding part, or of which the axis of rotation incorporates a bearing or is made of more-flexible material than that of its main structure.

Figure 4:
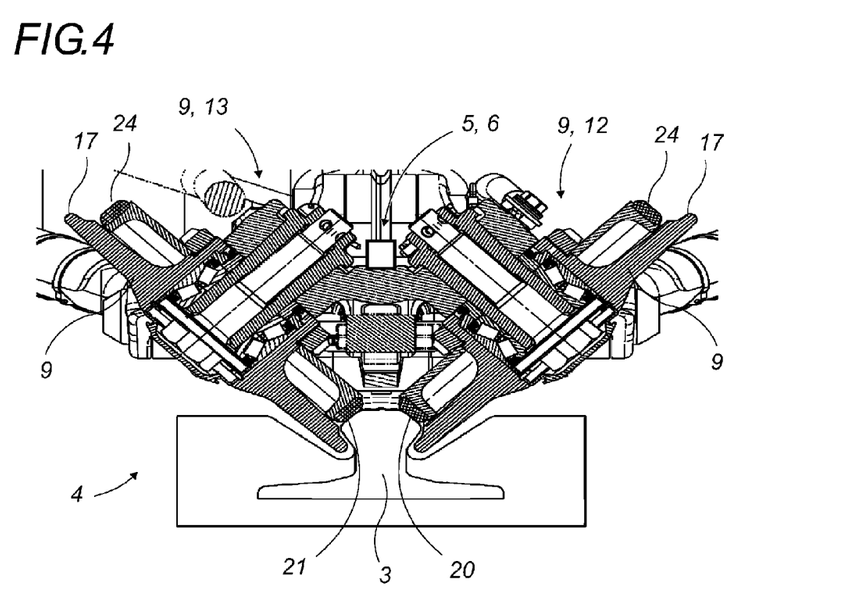
FIG. 4 is a transversal cross-section of the guidance system, at the level of the line of the transversal cross-section illustrated in FIG. 2.

Each axle or axle frame (10) is oriented by an arm, (18) and (19), carrying a pair, (11), (14), of rollers (9) inclined within a V-type configuration, of which the lower part is in contact with the inclined lateral edges, (20) and (21), and with the chamfer of the guide rail (3). This pair, (11), (14), of guide rollers (9) follows the guide rail (3), rolling on the lateral edges, (20) and (21), used as a path, and orients the axle or the axle frame (10), in a manner similar to a trailer linkage. All the lateral forces—caused by the wind, or by centrifugal force, for example—are taken-up by the tires, (22) and (23), in relation to the axle frame (10) and the vehicle. Only the forces necessary for the orientation of the axle frames (10) are taken-up by the guidance system (2).

The rollers (9) and the chamfered lateral edges, (20) and (21), of the guide rail (3) are inclined at 45°, which reduces the vertical load on the rollers (9) and transmits the forces on the guide rail (3) due to the rolling of the rollers (9) and not due to friction with the flanges (17) on the guide rail (3).

For reasons of comfort and, above all, of less noise, and so as not to inflict wear on the rail, the rollers (9) often have a tire such as (24) in a flexible material, through which they are and remain normally in contact with the guide rail (3), and that ensures a gentle contact with it. This disadvantage of this material is that it wears with rolling time, which necessitates its replacement. One can also imagine that this part could also be made of steel, but with an appropriate form that makes it more flexible radially and, therefore, of lesser stiffness than the flange.

One can also obtain a different vibrational signature between the rolling peripheral area and the flanges or the protruding part of the mounting of the wheels by working various local reliefs or imprints, which may or may not be repetitive, in the form of striations or flat spots, or changes of form, or other workings, for example, on the periphery of the flanges.

Exceptionally, it can the contrary as regards the differences in stiffnesses, namely the stiffness characteristics of the flange(s) or the protruding part can be lesser than the stiffness characteristics of the rolling periphery of the rollers.

The guidance system (2) also incorporates a forward sliding butt (25), referred to as a guard-iron, with a support structure with oblique arms, (28) and (27), a spring (28) providing permanent pressure against the arm, two pivoting shafts, (29) and (30), for its lifting, lugs such as (31) and (32) for the rollers, and various electrical connections, (33) and (32), to return power supply current from the vehicle as electrical energy.

According to the invention, a vibrational sensor (5) is provided near each pair, (11), (14), of rollers (9), that will transmit signals indicating the vibrational state of the mechanical assembly formed by the two rollers, (12) and (13), (15) and (16), of a same pair, (11), (14), of rollers (9) and their mounting as illustrated in FIGS. 2 to 5.

There is an advantage in terms of detection precision if one locates the vibrational sensor (5) as close as possible to the pair, (11, 14), of rollers (9).

When each roller (9) rolls normally with its tire (24) in flexible material on its inclined rolling path, (20) and (21), on the guide rail (3), the frequency signature or the signal spectrum of the vibrational sensor (5) has a given form. If the roller (9) or a part of it rolls on or rubs against the rail (3), the metal-on-metal contact causes a different vibration, and the vibrational signature, for example, in frequencies of the vibrational sensor (5)—namely, its breakdown into frequencies—has a different form and content. Thus, by comparison, one can detect a problem of whatever kind in at least one of the rollers (9)—for example, wearing of its tire (24) of flexible material, or a guidance failure.

To eliminate all doubt as regards the nature of the problem detected by the vibrational sensor (5), particularly distinguishing between wearing of or damage to the tire (24) and a guidance failure, one uses a proximity sensor (7) in the form of, for example, an inductive proximity sensor (8) that continually indicates its distance—particularly vertical—in relation to a reference surface.

Figure 5:
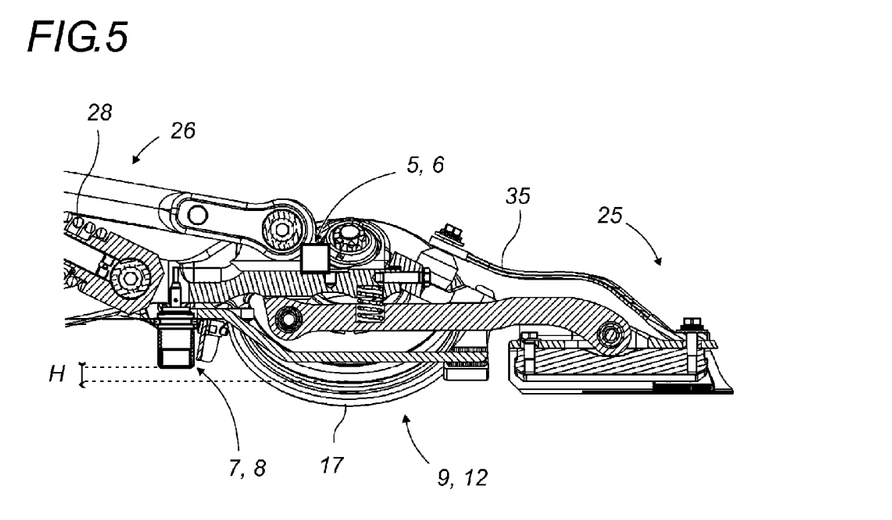
FIG. 5 is a longitudinal cross-section of the guidance system, at the level of the line of the longitudinal cross-section illustrated in FIG. 2.

This proximity sensor (7) is mounted on the guidance system (2) at a location that enables it to give a relatively interference-free indication of the distance in relation to a reference surface—particularly its distance in relation to the upper surface of the guide rail (3), which is hereafter referred to as dimension H and is identified in FIG. 5.

In the event of a problem detected by the analysis of the signal from the vibrational sensor (5), and if the value of dimension H is greater than its normal value, i.e. the value corresponding to normal guidance operation of the guidance system (2), then there is a guidance failure, namely guide rollers (9) no longer rolling normally on the guide rail (3) through contact of their tires, or there is a sensor failure. If the value of H measured by the proximity sensor remains nearly constant and close to its normal value, and if there is a vibrational alarm, one can suspect wearing of or damage to the tires of the rollers. In any case, each time there is a vibrational alarm at the same time as a proximity alarm triggered by the proximity detector, one can conclude that there has been a guidance failure.

By construction, the vibrational sensor (5) and the proximity sensor (7) are preferably mounted near the cables (33), (34) and (35) for current return from the vehicle.

In order to prevent any electromagnetic interference for the signal that they transmit, the vibrational sensor (5) and the proximity sensor (7) are connected to a processing unit via screened cables.

The sensors constituting the vibrational sensor (5) and the proximity sensor (7) are often transmitters, namely they supply a signal corresponding to the values to which they are sensitive. They can also be passive components of which the electrical characteristics change. Obviously, this type of sensor will be installed in an appropriate detection circuit.

Figure 6:
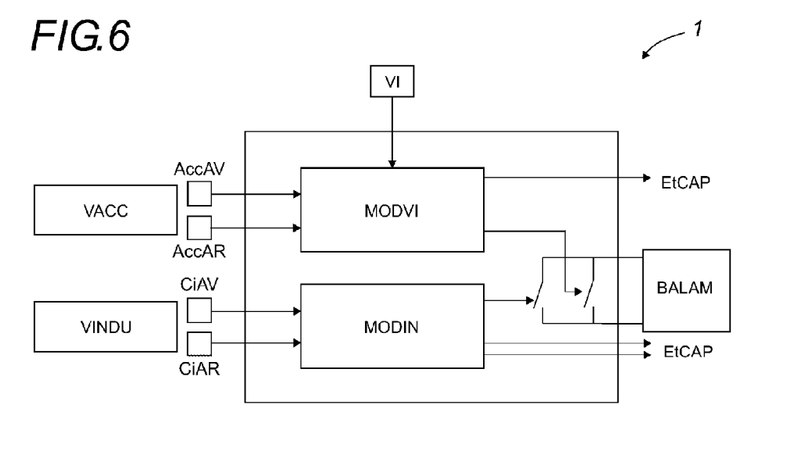
FIG. 6 is a block diagram showing the composition of the system.

As illustrated in FIG. 6, the unit for processing and analyzing signals transmitted by the vibrational sensor (5) and proximity sensor (7) incorporates, in parallel, a VACC accelerometric channel incorporating an MODVI vibrational processing module and a VINDU inductive channel with a MODIN inductive processing module.

The processing modules are connected respectively to the AccAV and AccAR front and rear vibrational sensors (5) in one case, and the CiAV and CiAR front and rear proximity sensors (7), in the other case. They incorporate various outputs with, for each one, an EtCAP output supplying an information item about the status of the sensors and, for each one, a main output terminating at a BALAM alarm multi-channel unit.

The MODVI vibrational processing module in FIG. 6 receives the VI speed information items and the signals from the AccAV and AccAR front and rear vibrational sensors (5). It is illustrated schematically in FIG. 7.

Figure 7:
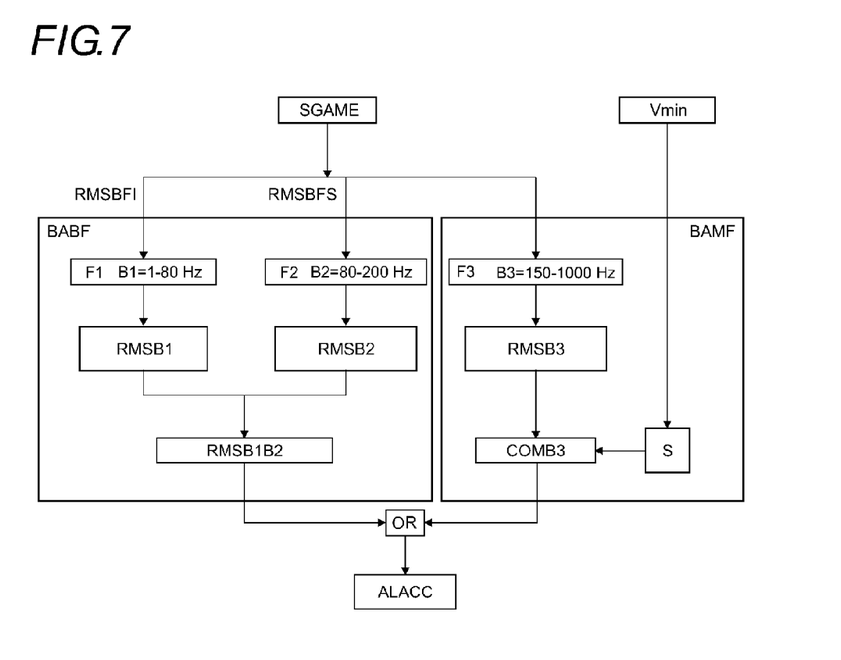
FIG. 7 is an organization table illustrating an example of analysis of the signal from the sensors to be utilized.

It is composed of two units for processing and analysis working from vibrational frequency ranges: one BABF low frequencies unit, and one adjacent BAMF medium frequencies unit.

The BABF and BAMF processing units are supplied the signal measured from the vibrational sensor(s) (5), SGAME.

The first unit BABF incorporates two channels: one RMS-BFI medium-level channel for lower low frequencies, and an second medium-level channel for higher low frequencies. Each channel starts respectively with one low-pass filter 1 in in the 1-80 Hz range, B1, and one bandpass filter F2 in the 80-200 Hz range, B2, that are followed by a module for measurement of the level of the effective voltage respectively at lower low frequencies, B1, the RMSB1 module, and at higher low frequencies, B2, the RMSB2 module.

The two levels are compared in a differentiation module, RMSB1 B2.

If their difference is higher than a threshold corresponding to a given level—6 dB, for example—an accelerometric alert ALACC is triggered.

The adjacent medium frequencies analysis unit, BAMF, is also fed by the signal from the measured vibrational sensor(s) (5), SGAME. It has a channel composed of a higher medium frequencies bandpass filter, F3, in the 150-1,000 Hz range, B3, followed by a module for measurement of the level of the effective voltage of the higher medium frequencies, B3, the RMSB3 module. This level is compared to a threshold S in a comparator COMB3.

This threshold S differs according to whether the vehicle is above or below a minimal speed, Vmin–15 kph, for example. One assigns a different value from the threshold S, by means of an encoder, if the speed of the vehicle is lower than or greater than Vmin.
For example:
Vmin>15 kmh S=9
Vmin<15 kmh S=3

The comparator COMB3 transmits an alarm signal if the effective voltage level of the signal B3 is greater than the value of the threshold S.

The two alert signals of the two processing units are enabled on the ALACC accelerometric alert channel by a logical OR unit.

Figure 8:
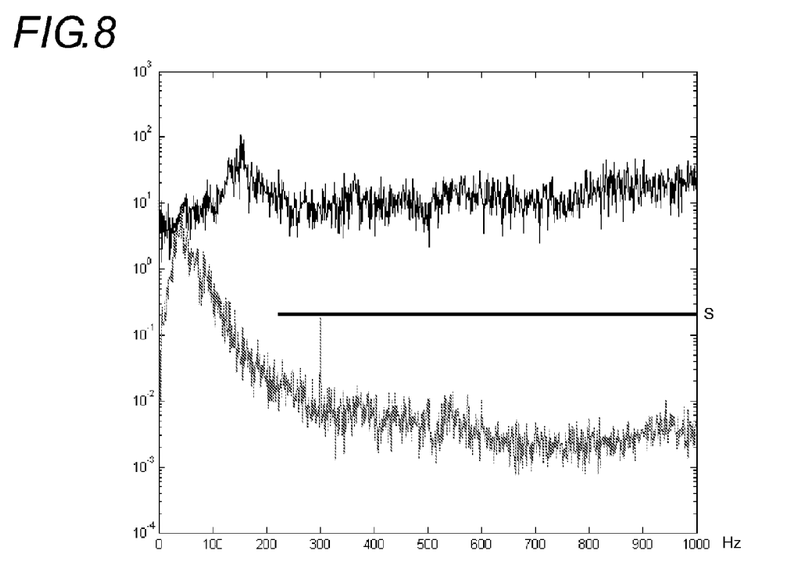
FIG. 8 is a graphic comparing two frequency spectra of average power on a route, coming from an accelerometer with, at the top, the frequency signature in the case of a guidance failure and, at the bottom, the frequency signal in the case of normal guidance operation.

By referring now to the general schematic in FIG. 8, one understands that the rise of the value of the dimension H above its set value—corresponding to the reference surface and jointly with the rise above an effective threshold level for the measured frequency bands of the signal from the vibrational sensors (5)—enables one to conclude on a derailment.

Figure 9:
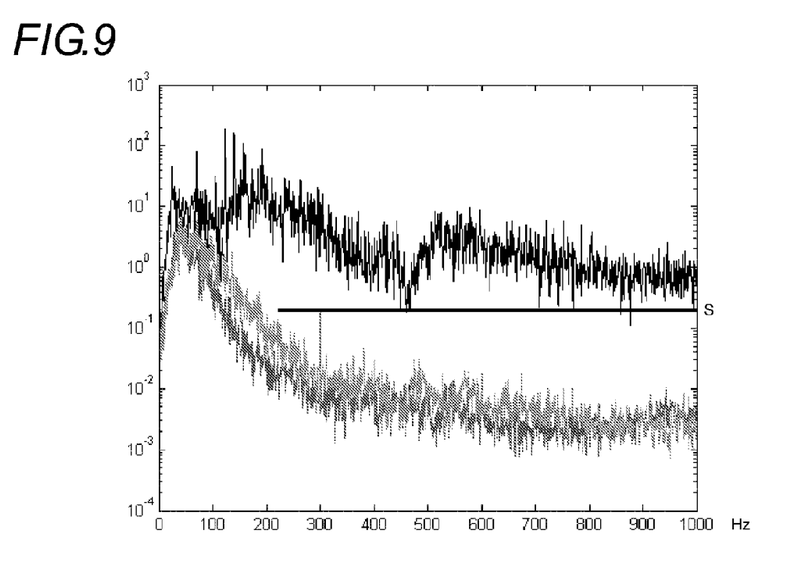
FIG. 9 is a graphic comparing three frequency spectra of average power on a route, coming from an accelerometer with, respectively, from top to bottom, a roller that is 100% worn, a roller that is 50% worn, and a new roller.

FIGS. 8 and 9 show, in a comparative manner, an example of frequency signatures at the level of a vibratory sensor (5) in the form of an accelerometer (6). Each time, it is with reference to a normal guided mode, of which the signature is to be found at the bottom of each Figure.

In FIG. 8, when one compares the signature in guided mode with the signature in guidance failure mode, which is at the top, one notices an average level that is higher in the case of a guidance failure, with a peak in low frequencies. One can thus easily detect a guidance failure.

In FIG. 9, the characteristics of the spectra differ between the new roller and the roller that is worn or that has a worn tire or trim. The spectrum of the 50%-worn wheel is close to that of the new wheel in guided mode. Therefore, it is only when there is very pronounced wear that the spectra differ considerably. The 100%-worn roller(s) spectrum is located at the top, and is different in form. In contrast, intermediate wear presents a spectrum that is close to that of a new roller in guided mode, which necessitates eliminating the doubt by means of the indication coming from the proximity sensor according to the invention. This additional indication coming from the proximity sensor enables one to conclude either that a guidance failure has occurred, or that there is wear in the tire(s), or that sensor failures have occurred.

In usage, a different alarm signal can be transmitted, according to whether the dynamic monitoring system (1) according to the invention detects a rail (3) contact fault, and whether this fault has occurred with a pair (11) of leader rollers, (12) and (13), and/or within a pair (14) of follower rollers, (15) and (16), thereby allowing adaptation of the measures to be taken to prevent derailment. Among the measures to be taken, one can cite—for example—a decrease in the speed of the vehicle, an emergency stoppage of the vehicle, or the triggering of an active anti-derailment system or re-enrailment system, or any other appropriate action.

For this purpose, the dynamic monitoring system according to the invention preferably uses an analog processing interface allowing one to implement a guidance failure detection functionality without using programmed logic.

Obviously, the invention is not limited to the preferential implementation described above and illustrated in the various Figures; an appropriately-knowledgeable professional can make many modifications and devise other variants without going beyond the range or scope of the invention.

The invention claimed is:

1. A guidance system of a ground vehicle along at least one guide rail, the guidance system being endowed with a dynamic monitoring system for dynamic control of contact with the rail, the guidance system comprising of at least one roller or at least one pair of guide rollers rolling along at least one guide rail, the guidance system having a first state in which at least one roller or at least one pair of rollers rolls on at least one guide rail via a tire, a rolling surface or a rolling periphery in a normal guidance situation, and a second state in which at least one of the rollers, or a protruding surface of a mounting of at least one of the rollers, rolls on or rubs against the guide rail or the road surface in a derailed situation, characterized in that:
   the vibrational characteristics of the part of the roller or rollers in normal rolling contact with the guide rail during a normal guidance situation, and the vibrational characteristics of the area in contact with the guide rail or the road surface in a derailed situation, are different; and
   the dynamic monitoring system incorporates a vibrational sensor located near at least one roller or at least one pair of guide rollers and a proximity sensor; and the dynamic monitoring system incorporates a unit for processing and analyzing signals from the sensors or from circuits in which the sensors are placed, in order to analyze the signals and continually establish whether the signals from the vibrational sensor and the signals from the proximity sensor exceed a first warning threshold and a second warning threshold, respectively, such that a derailment alarm is triggered if the first and second thresholds are exceeded.

2. The guidance system according to claim 1, characterized in that the stiffness of the part of the roller or rollers in normal rolling contact with the rail during guidance is less than the stiffness of the area in contact with the rail or the road surface in a derailed situation.

3. The guidance system according to claim 1, characterized in that the protruding surface is the flange of each roller, or a casing, or a fixed surface in rotation on the mounting of the rollers.

4. The guidance system according to claim 1, characterized in that a rise above the first warning threshold corresponds to a fault in the vibrational sensor.

5. The guidance system according to claim 1, characterized in that the proximity sensor is a sensor of proximity of the upper surface of the guide rail.

6. The guidance system according to claim 1, characterized in that the proximity sensor is an inductive sensor.

7. The guidance system according to claim 1, characterized in that the vibrational sensor is an accelerometer.

8. The guidance system according to claim 1, characterized in that one establishes a threshold as a function of the speed of the vehicle.

9. The guidance system according to claim 8, characterized in that the threshold dependent on the speed of the vehicle is modified if the speed of the vehicle is greater than 15 kph.

10. The guidance system according to claim 1, characterized in that the unit for processing and analysis of the signals from the sensors is a frequency spectrum processing and analysis unit.

11. The guidance system according to claim 10, characterized in that the unit for processing and analysis of the signals transmitted by the vibrational and proximity sensors incorporates, in parallel, a VACC accelerometric channel incorporating a vibrational processing module, MODVI, and an inductive channel, VINDU, with an inductive processing module, MODIN, and in that the processing modules are respectively connected to the front and rear vibrational sensors, AccAV and AccAR, in one case, and to the front and rear proximity sensors, CiAV and CiAR, in the other case, and in that they incorporate various outputs, with each one having an EtCAP output supplying an information item concerning the state of the sensors, and with each one having a main output terminating at a BALAM multi-channel alarm unit, and in that the MODVI vibrational processing module receives VI speed information items and signals from the front and rear vibrational sensors, AccAV and AccAR, and is composed of two processing and analysis units—one BABF low frequency unit and one adjacent BAMF medium frequency unit.

12. The guidance system according to claim 11, characterized in that the BABF and BAMF processing units are supplied with the signal from vibrational sensor(s), SGAME.

13. The guidance system according to claim 11, characterized in that the first unit, BABF, incorporates two channels—one medium level channel for lower low frequencies, RMSBFI, and a second medium level channel for higher low frequencies, RMSBFS—and in that each channel commences with respectively one low-pass filter, F1, in the 1-80 Hz range, B1, and one band-pass filter, F2, in the 80-200 Hz range, B2, that are followed by a module for measurement of the level of the effective voltage respectively in lower low frequencies, B1, module RMSB1, and higher low frequencies, B2, module RMSB2, and in that the two levels are compared in a differentiation module, RMSB1 B2, so that if their difference is greater than a given level, an accelerometric alert ALACC is triggered.

14. The guidance system according to claim 13, characterized in that the adjacent unit for analysis of medium frequencies, BAMF, is also supplied with the signal from the measured vibrational sensor(s), SGAME, in that it has a channel composed of a higher medium frequency band-pass filter, F3, in the 150-1,000 Hz range, B3, followed by a module for measurement of the effective level of the voltage of the higher medium frequencies, B3, module RMSB3, in that this level is compared with a threshold S in a comparator, COMB3, in that if this threshold S differs in that it is above or below a minimum speed of the vehicle, Vmin, an encoder assigns a different value of the threshold S if the vehicle's speed is lower or higher than Vmin, the comparator COMB3 transmits an alarm signal if the effective level of the voltage of the signal B3 is higher than the value of the threshold S, and in that the two warning signals of the two processing units are enabled on the ALACC accelerometric warning channel by a logical OR unit.

* * * * *